July 4, 1950 M. J. SHEDLOCK 2,514,144
REEL
Filed Aug. 1, 1946 2 Sheets-Sheet 1
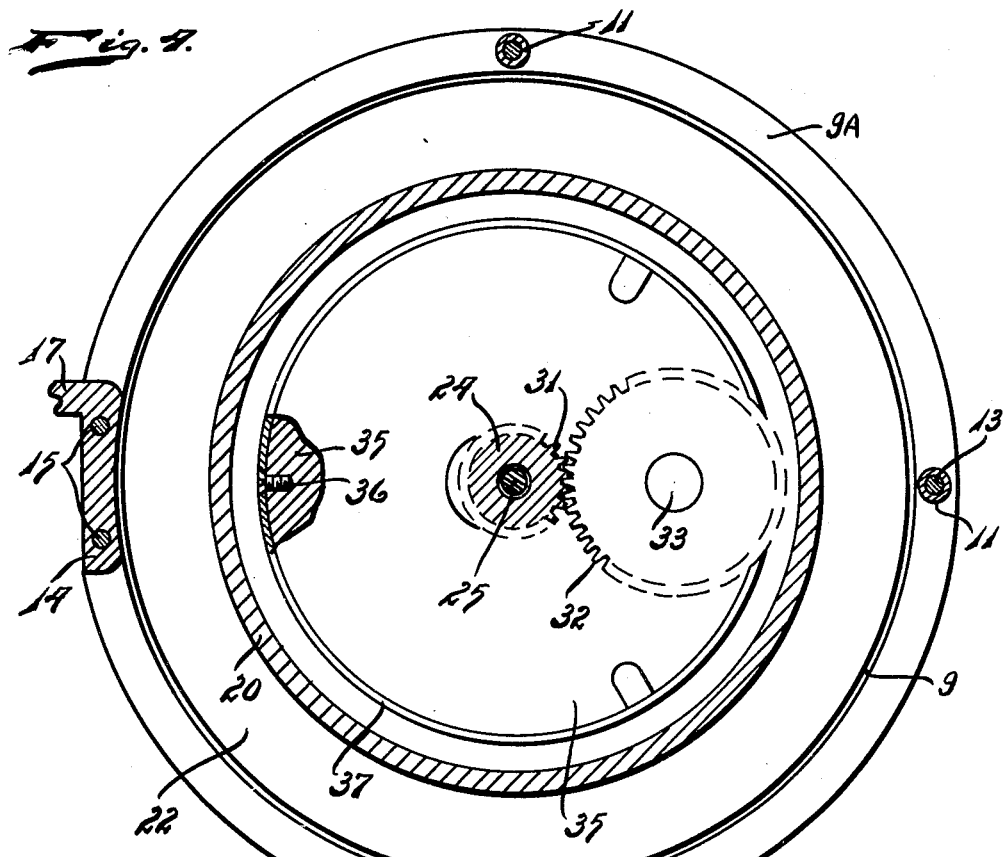
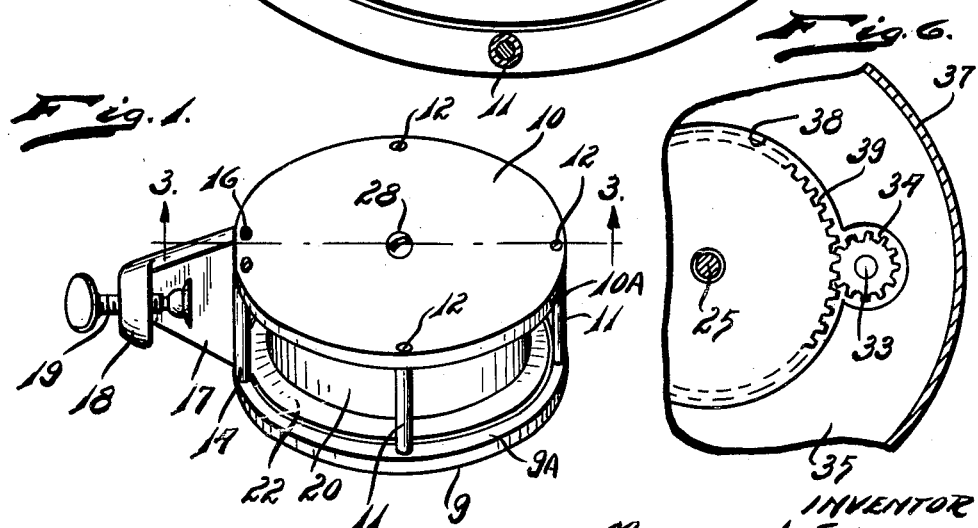
INVENTOR
MICHAEL J. SHEDLOCK
BY
*Thos. L. Donnelly*
ATTORNEY July 4, 1950  M. J. SHEDLOCK  2,514,144
REEL
Filed Aug. 1, 1946  2 Sheets-Sheet 2
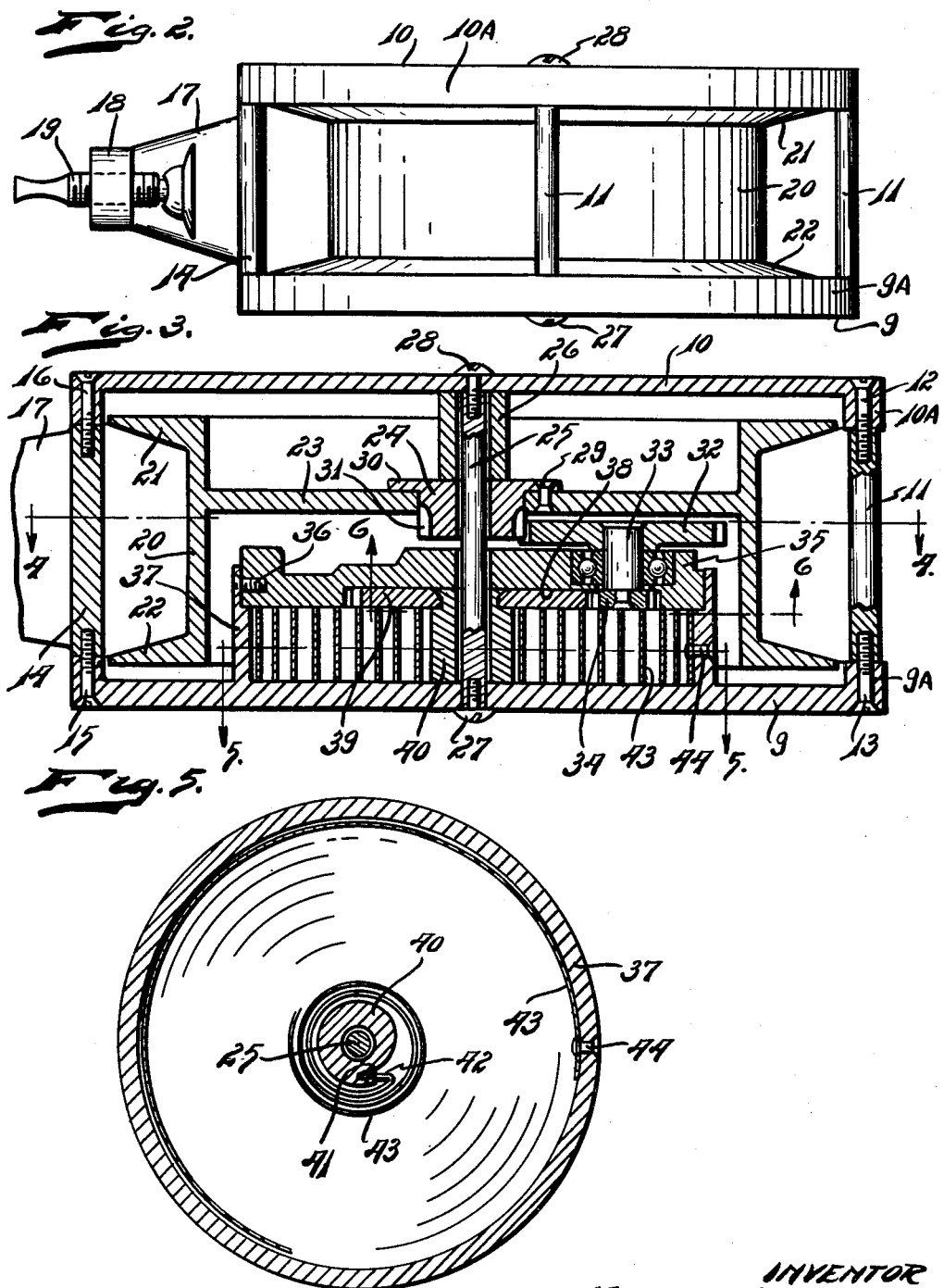
INVENTOR
MICHAEL J. SHEDLOCK
BY
ATTORNEY Patented July 4, 1950

2,514,144

UNITED STATES PATENT OFFICE 2,514,144

REEL

Michael J. Shedlock, Detroit, Mich.

Application August 1, 1946, Serial No. 687,665

1 Claim. (Cl. 242—108)

My invention relates to a new and useful improvement in a reel adapted for reeling in fish lines of considerable length. Particularly in trolling it is quite common to have several hundred feet of fish line out so that when the fish strikes considerable line has to be reeled in. The present invention provides a reel whereby this reeling in of a very long line may be easily and quickly accomplished.

It is an object of the invention to provide a reel of this class which will be simple in structure, economical to manufacture, durable, compact, light, easily and quickly assembled and possessed of a minimum number of parts.

Another object of the invention is the provision of a reel so arranged and constructed that a rapid reeling in of the line may be effected through a spring action.

Another object of the invention is the provision of novel construction whereby the spring will be enclosed and the various parts protected from dust and the like.

Other objects will appear hereinafter.

It is recognized that various modifications and changes may be made in the detail of structure illustrated without departing from the invention and it is intended that such shall be embraced within the scope of the claim which forms a part hereof.

Forming a part of the specification are drawings in which,

Fig. 1 is a perspective view of the invention,

Fig. 2 is an enlarged side elevational view of the invention,

Fig. 3 is a central sectional view of the invention with parts broken away and parts shown in section, Fig. 4 is a sectional view shown on line 4—4 of Fig. 3, with parts broken away, Fig. 5 is a sectional view taken on line 5—5 of Fig. 3, Fig. 6 is a fragmentary view taken on line 6—6 of Fig. 3.

In the drawings I have illustrated the invention comprising a pair of side plates 9 and 10 provided with the flanges 9a and 10a projecting inwardly from the perimeter of these side plates 9 and 10 which are formed circular. Positioned between these flanges 9a and 10a are spacing rods 11 into which are threaded the bolt screws 12 and 13 for securing the parts together. Positioned between the flanges 9a and 10a at one side of the structure, is a bracket plate 14 secured to the plates by the screws 15 and 16. Extending outwardly from this bracket plate 14 is a bracket 17 having the angularly turned head 18 through which is threaded the set screw 19 whereby the structure may be clamped to the side of a boat.

A rotatable reel wheel is provided embodying the disc 23 on which is mounted the rim 20 having the outwardly projecting side flanges 21 and 22. Extended through a central opening formed in this disc 23 is a hub 24 through which extends the axle forming rod 25. This rod also extends through the spacing sleeve 26 and the screws 27 and 28 serve to secure the rod or axle 25 in position. Rivets 29 are extended through the flange 30 formed on the hub 24 so that the hub 24 is secured to the disc 23 in fixed relation thereto. As shown clearly in Fig. 3, this hub is of greater length than the thickness of the plate 23 so that it projects beyond one side thereof and on this projecting end of the hub 24 are formed teeth 31. These teeth 31 mesh with the teeth of a pinion 32 which is fixedly mounted on the shaft 33 to which is also fixedly secured the gear 34. This shaft 33 is journaled in the plate 35 which is secured by the screws 36 to the annular member 37 which projects inwardly from the inner face of the plate 9. The plate 35 is provided on one of its faces with a recess 38 and the gear 34 is positioned in this recess. This gear 34 meshes with the gear 39 which is fixedly mounted on the hub 40. This hub 40 is provided on its periphery with a slot 41 in which engages the angularly turned end 42 of the spirally wound leaf spring 43. The opposite end of this clock or helical spring 43 is secured to the wall 37 by means of the rivet 44.

When the parts are assembled as shown in Fig. 3, and the fish line is wound on the reel member, an unwinding of the line will, of course, effect a rotation of the plate or disc 23 which will rotate the member 24. This will effect a rotation of the shaft 33 and the gear 34 so that the gear 39 will be rotated to wind the spring. In this winding of the spring or the unwinding of the line from the reel, it will be noted there is a reduction gearing so that the winding of the spring proceeds slowly compared to the speed of the rotation of the reel itself. When the reel is released for winding the line onto the reel again, a reverse action is effected. The spring, which will be under compression, will effect a rotation of the gear 39 which, in turn, will effect the rotation through the gear 34, the shaft 33, and the gear 32 of the hub 24 which is fixedly attached to the member 23. Consequently, the winding of the line onto the reel is by a gearing which is speeded up so that the line is rapidly wound onto the reel. This, of course, is desirable. On the other hand, the slow winding of the spring upon unwinding the line from the reel permits the maximum amount of line to be unwound with the compression effected on the spring. This is accomplished by the gearing arrangement described. This also makes it possible to keep the structure in compact size so that a bulky body is not necessary.

With the construction described it is believed obvious that an easy and quick assembly may be effected while the spring itself and the gears directly effected thereby are enclosed in a housing. It will be noted that the shaft 25 serves as the axle for the hub 40 and the hub 24.

It will be noted that the side wall 9 together with the annular portion 37 and the wall 35 form a housing in which the spring is positioned. It will also be noted that the flanges 9a and 10a terminate in close proximity to the periphery of the flanges 21 and 22. These flanges 9a and 10a, cooperating with the flanges 21 and 22 and the spacing members 11, serve to prevent the line from jumping off of the reel. Frequently, when playing out the line and the boat from which the line is being let out is traveling and the hook hits a snag the line is then fed out very rapidly so that the reel may have a tendency to over-run itself or where a line would have the tendency to uncoil itself on the reel. This frequently causes a wire line to jump off of the reel and engage along the side of the pulley on which it is wound. With the present structure this, of course, is prevented.

Experience has shown that a reel constructed in this manner is one which is most efficient in use and which is durable as the parts are not subjected to great wear and do not become disarranged.

What I claim is:

In a device of the class described, a winding reel; a plate mounted on opposite sides of said reel in spaced relation thereto; a housing on the inner face of one of said plates; a shaft projected through said reel and said housing, centrally thereof and projecting between and secured to said plates, said reel being rotatable on said shaft; a gear fixedly mounted on said reel centrally thereof and rotatable in unison therewith; a gear exterior of said housing meshing with said gear on said reel and of larger diameter; an axle connected fixedly to said second mentioned gear and projecting into said housing; a smaller gear mounted on said axle within said housing; a gear of larger diameter than any of said mentioned gears meshing with said smaller gear and positioned centrally of said housing; a hub connected to said last named gear; a helical spring positioned in said housing, one end of said spring being connected to said housing and the other end of said spring being connected to said hub, a portion of said reel surrounding said housing in spaced relation.

MICHAEL J. SHEDLOCK.

REFERENCES CITED

The following references are of record in the file of this patent:

UNITED STATES PATENTS

| Number | Name | Date |
|---|---|---|
| 599,138 | Boyle | Feb. 15, 1898 |
| 1,137,217 | Lane | Apr. 27, 1915 |
| 1,446,410 | Bennett et al. | Feb. 20, 1923 |
| 1,547,297 | Case | July 28, 1925 |
| 2,131,223 | Earll | Sept. 27, 1938 |
| 2,145,474 | Burdick et al. | Jan. 31, 1939 |
| 2,159,004 | Bosch, Jr. | May 23, 1939 |